(12) United States Patent
Skapof et al.

(10) Patent No.: US 9,434,318 B2
(45) Date of Patent: Sep. 6, 2016

(54) INTERIOR ROTATING LID OBJECT BUMPER

(71) Applicant: HONDA MOTOR CO., LTD., Tokyo (JP)

(72) Inventors: Robert A. Skapof, Dublin, OH (US); Dwayne W. Malone, Delaware, OH (US); Neal W. Luginbill, Marysville, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 897 days.

(21) Appl. No.: 13/722,620

(22) Filed: Dec. 20, 2012

(65) Prior Publication Data
US 2014/0175107 A1    Jun. 26, 2014

(51) Int. Cl.
*B60R 7/04* (2006.01)

(52) U.S. Cl.
CPC ...................................... *B60R 7/04* (2013.01)

(58) Field of Classification Search
CPC ........... B60R 7/04; B60R 7/06; B60R 7/082; B60K 2350/405; B60K 2350/925; B60N 2/4686
USPC ............. 220/815, 669, 811; 296/24.34, 37.1, 296/24.3
See application file for complete search history.

(56) References Cited

U.S. PATENT DOCUMENTS

| | | | |
|---|---|---|---|
| 6,739,640 B2 | 5/2004 | Schmidt et al. | |
| 6,746,067 B2 | 6/2004 | Schmidt et al. | |
| 6,789,831 B2 | 9/2004 | Schmidt et al. | |
| 7,731,254 B2 * | 6/2010 | Lota | B60R 7/04 248/311.2 |
| 8,517,447 B2 * | 8/2013 | Biggs | B60R 7/04 296/24.34 |

FOREIGN PATENT DOCUMENTS

| | | |
|---|---|---|
| JP | 2009 46064 A2 | 3/2009 |
| JP | 2009 248793 | 10/2009 |

* cited by examiner

*Primary Examiner* — Anthony Stashick
*Assistant Examiner* — Blaine Neway
(74) *Attorney, Agent, or Firm* — Kenealy Vaidya LLP

(57) ABSTRACT

A storage assembly for an associated vehicle includes a pocket for storing associated articles. A lid is pivotally secured and selectively positionable between an open position that allows access to the pocket and a closed position that covers the pocket. The lid has an inner, first surface that coincides with a maximum fill line of the pocket when the lid is in the closed position, a recess formed in the first surface of the lid adjacent a first edge of the lid, and an object bumper extending adjacent at least a portion of the recess for preventing the associated articles from interfering with pivotal movement of the lid relative to the pocket.

17 Claims, 7 Drawing Sheets

INTERIOR ROTATING LID OBJECT BUMPER

BACKGROUND

This disclosure is directed to a storage assembly, and more particularly a pocket having a closeable lid as is commonly associated with a center console of an automotive vehicle. Selected aspects of the present disclosure may find application in related environments and applications.

It is known to provide a storage assembly such as a pocket holding loose items or small objects such as coins, fasteners, etc. It is likewise known to provide a selectively openable/closable lid for the storage assembly so that items received in a recess or pocket of the storage assembly are retained therein. Typically, the lid is pivoted between open and closed positions, and is usually mounted in such a manner that the lid pivots or rotates through a generally arcuate path over a terminal edge of a sidewall of the pocket. The terminal edge of the sidewall defines the true maximum fill line for the pocket. That is, other sidewall portions of the pocket may have a different or increased height relative to the sidewall terminal edge. When the lid of the storage assembly is open, users have a tendency to continue to deposit items in the pocket. For example, with the lid in an upright or open position, an undersurface of the lid allows additional items to be inserted into the pocket without overflowing, i.e., fill to an upper edge of the opening that forms the pocket and that substantially coincides with an underside or undersurface of the lid in a closed position. However, when the items are filled above a terminal edge of one of the sidewalls, and the user pivots the lid from the open position to the closed position, items can undesirably spill over the terminal edge of the pocket and thereby obstruct or jam further movement of the lid.

Consequently, a need exists for an alternative arrangement for the storage assembly that maximizes a volume of the storage pocket. Likewise, a need exists for an alternative arrangement that addresses the obstruction/lid jamming issues associated with prior arrangements.

SUMMARY

A storage assembly for an associated vehicle includes a surface having a perimeter edge and a pocket extending below the surface for storing associated articles. A lid is pivotally secured and selectively positionable between an open position that allows access to the pocket and a closed position that covers the pocket. The lid has an inner, first surface that coincides with a maximum fill line of the pocket when the lid is in the closed position, a recess formed in the first surface of the lid adjacent a first edge of the lid, and an object bumper extending adjacent at least a portion of the recess for preventing the associated articles from interfering with pivotal movement of the lid relative to the pocket.

The pocket has a first edge in close proximity to the lid recess during pivotal movement between the open and closed positions.

The object bumper includes a series of spaced projections extending along an edge of the recess.

The object bumper projections preferably each have a generally arcuate conformation that allows the lid to pivot from the open position to the closed position, and vice-versa.

Each object bumper projection has a generally arcuate conformation that allows the lid to pivot from the open position to the closed position, and vice-versa.

The pocket includes generally tapered sidewalls that extend from a base wall, and a cupped extension provided along one of the sidewalls that extends outwardly in a generally arcuate contour that corresponds to a generally arcuate conformation of the recess in the lid first surface.

The pocket includes a terminal edge over which the lid pivots between the open and closed positions, the terminal edge having a height less than a fill depth of the pocket.

The terminal edge has a height less than a remainder of an upper edge of the pocket.

The pocket includes a terminal edge over which the lid pivots between the open and closed positions, the terminal edge having a height less than a fill depth of the pocket.

A primary advantage of the new storage assembly is the ability to provide for a maximum fill line for the pocket.

Another benefit resides in the ability to limit the potential for objects to obstruct the lid during opening and closing movement relative to the pocket.

Still another advantage is associated with the improved aesthetics associated with the functional structure.

Yet another benefit relates to the reduced prospect that the lid can be jammed that prevents the lid from opening and closing correctly.

Still other benefits and advantages will become more apparent to those skilled in the art upon reading and understanding the following detailed description.

DETAILED DESCRIPTION

Figure 1:
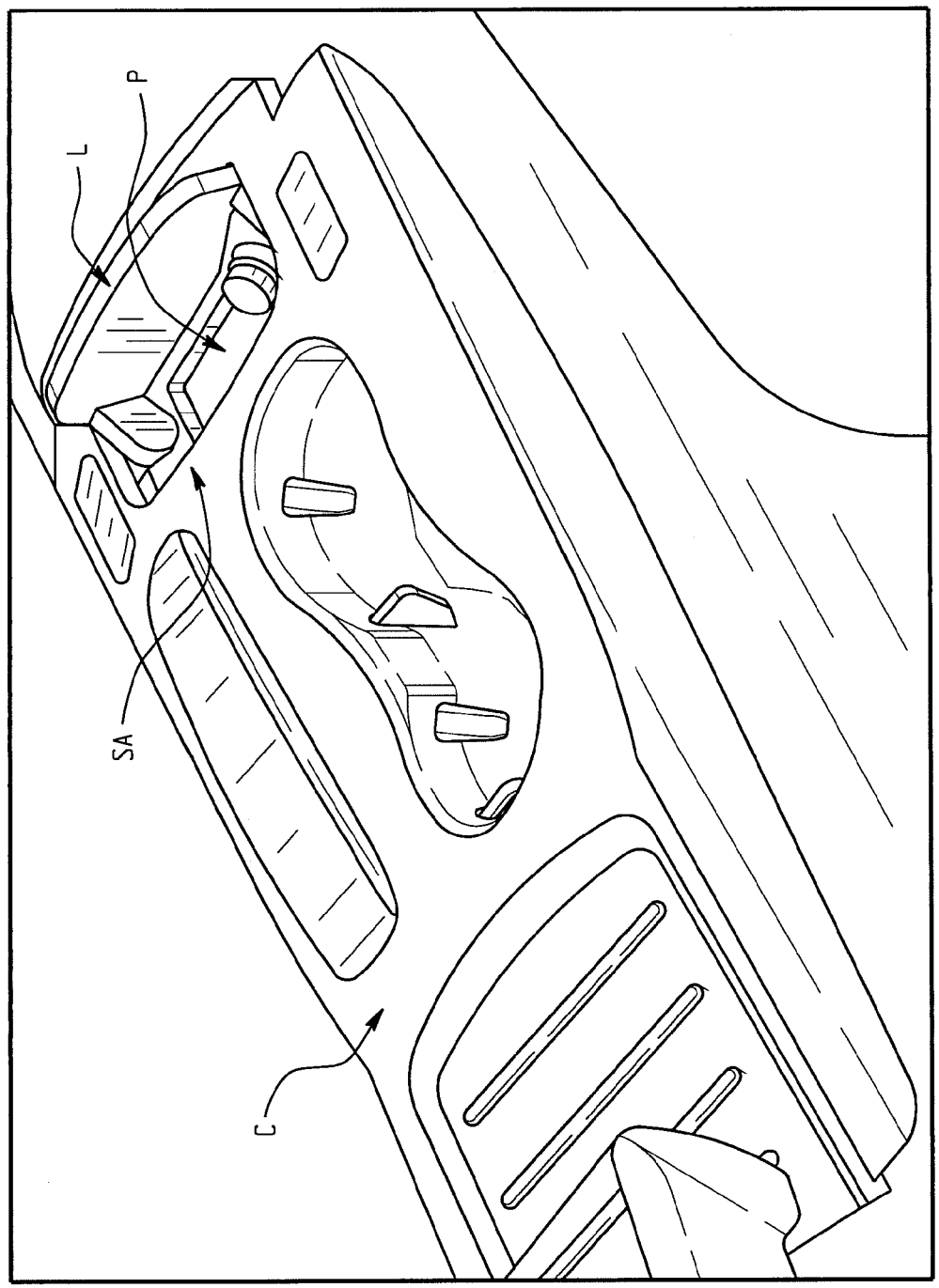
FIG. 1 is a perspective view of a prior art center console that incorporates a storage assembly.
Figure 2:
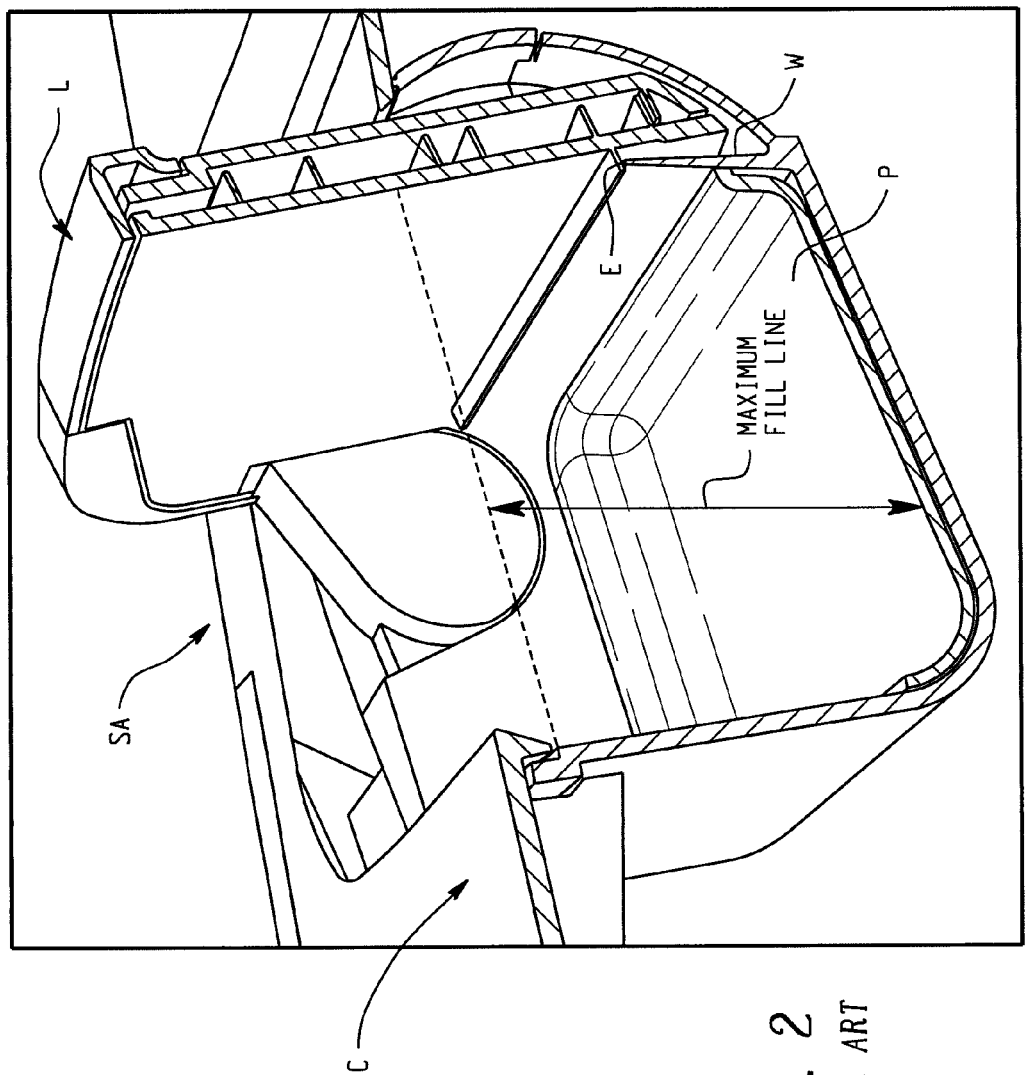
FIG. 2 is a cross-sectional view of the storage assembly of FIG. 1 with the lid in an open position.
Figure 3:
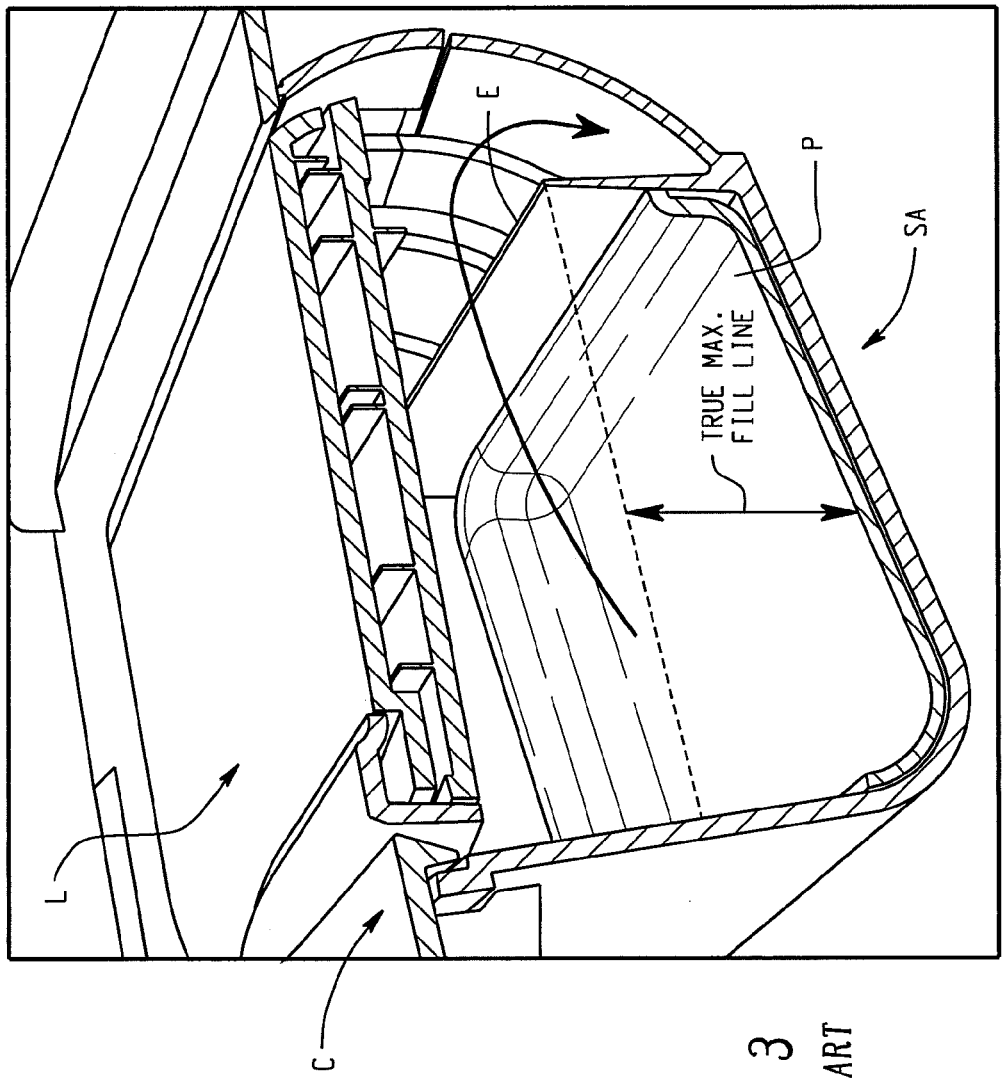
FIG. 3 is a cross-sectional view of the storage assembly of FIG. 1 with the lid in the closed position.

FIGS. 1-3 illustrate a prior arrangement of the storage assembly SA of the type that is incorporated into a center console C disposed between front seats (not shown) in an automotive vehicle. The storage assembly SA includes a pocket P that is recessed relative to an upper surface of the console. The pocket P receives small items or objects such as coins, tokens, fasteners, clips, receipts, etc. Generally these objects are deemed unsightly and to improve the aesthetics of the interior of the automotive vehicle, it is common for the storage assembly SA to include a lid L that allows selective access to the pocket P. For example, the lid P is mounted for pivoting movement or rotation through a limited range between open and closed positions (shown open in FIGS. 1 and 2, and shown in a closed position in FIG. 3). Oftentimes the user leaves the lid in an open position to allow ready access to the pocket. In this position as shown in FIG. 2, the pocket P may be filled with items to a level generally shown by the broken line and referred to as a "max fill line". However, if items are stored to this height or fill line, when the lid L is closed (as shown in FIG. 3) items or objects can spill over an upper edge E of one of the walls W defining the pocket sidewall. As will be appreciated from a comparison of FIGS. 2 and 3, a "true max fill line" represented by the dotted line in FIG. 3 is defined by the height of the upper edge E of the wall W over which the lid pivots. That is, the wall W has a reduced height relative to other portions of the sidewall of the pocket P in order to accommodate the pivoting movement of the lid L. Unfortunately, if items have been introduced into the pocket to the "max fill line" of FIG. 2, then pivoting movement of the lid L would allow the small items or objects to spill over the edge E of wall W. When the user then seeks to subsequently rotate the lid L to the open position of FIG. 3, the items can potentially jam or prevent rotation of the lid L and thereby prevent the lid L from opening, or fully opening relative to the pocket P.

Figure 5:
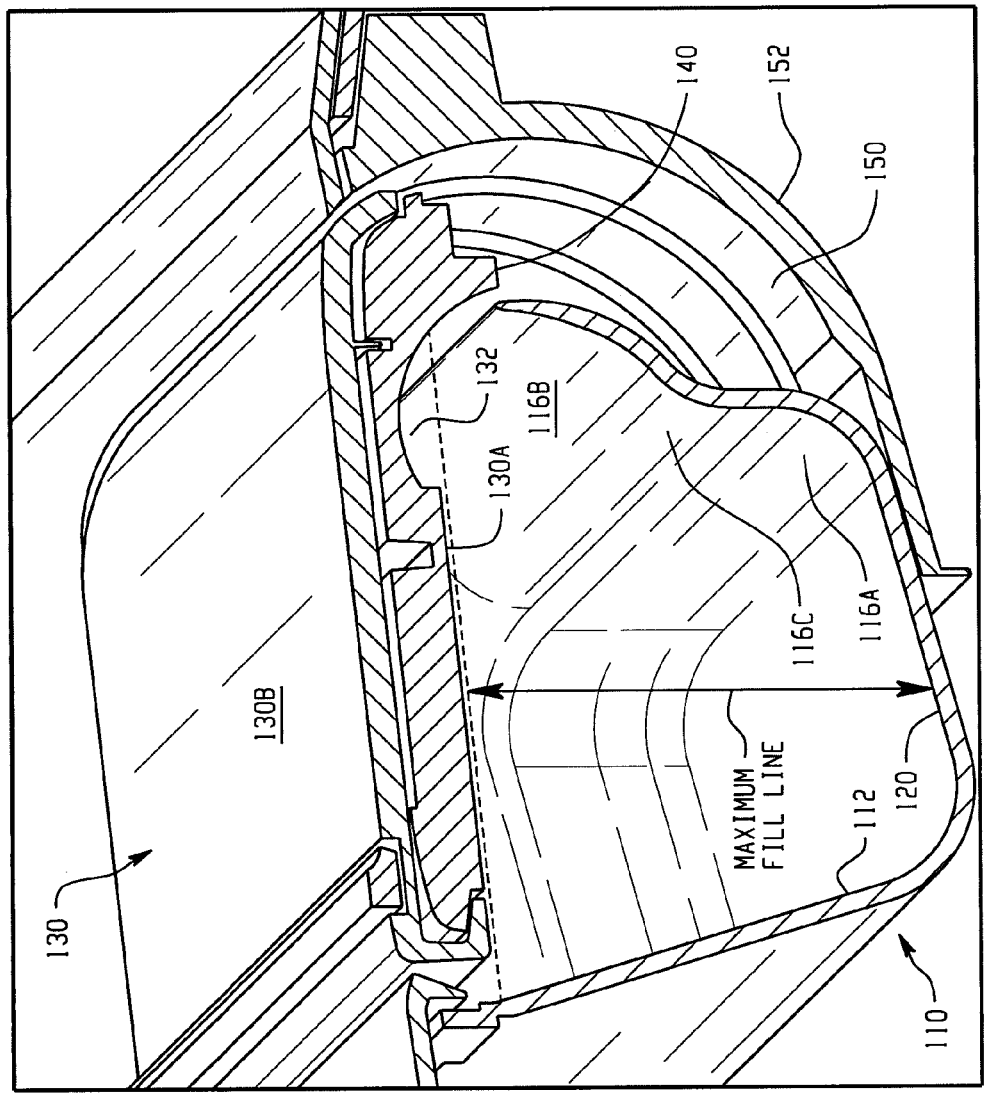
FIG. 5 is a cross-sectional view similar to FIG. 3 of the improved storage assembly of FIG. 4.
Figure 6:
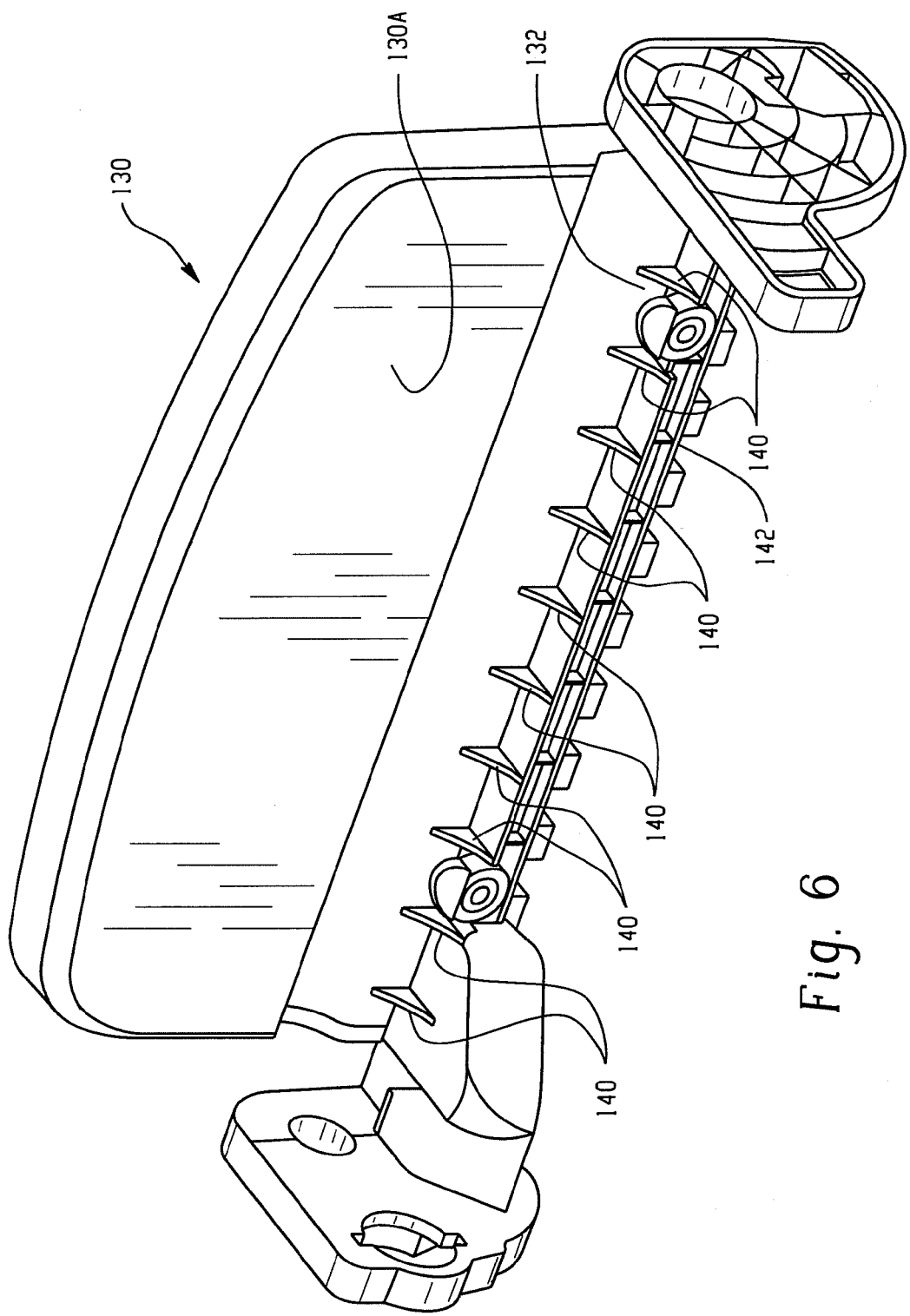
FIG. 6 is a perspective view of the lid of FIGS. 4 and 5 in an open orientation.
Figure 7:
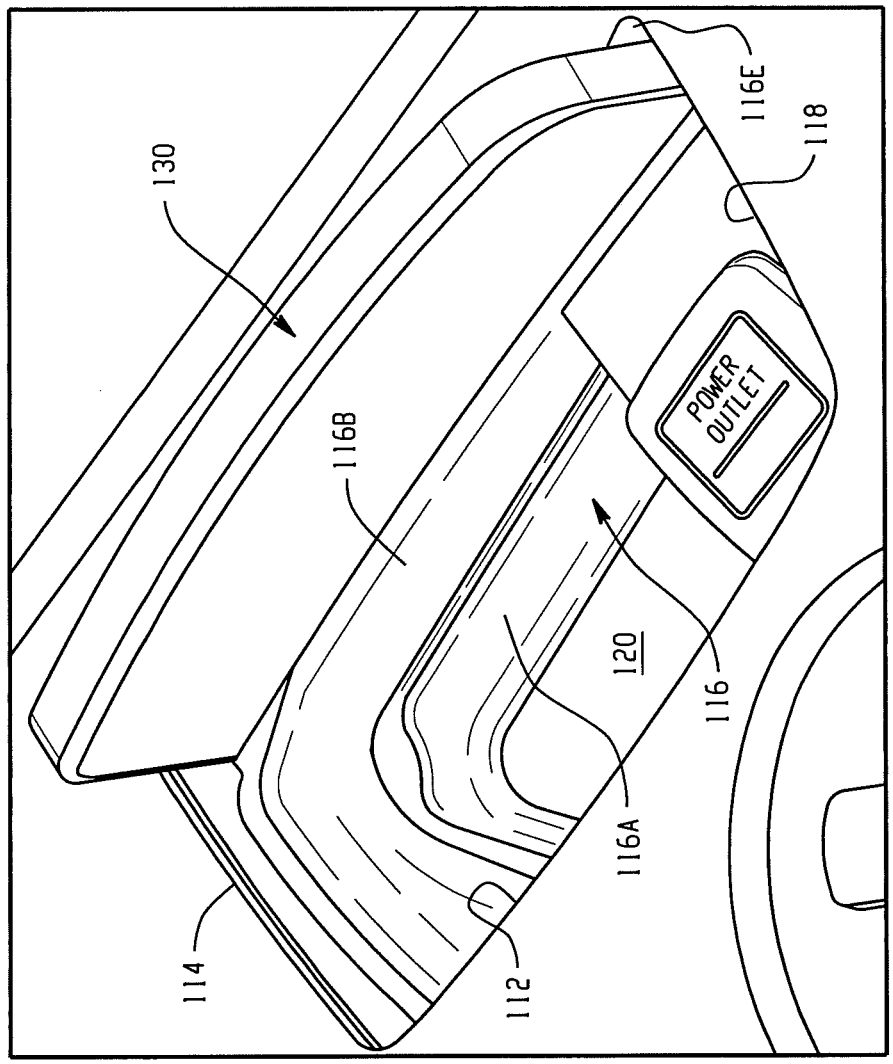
FIG. 7 is a perspective view of the lid in an open position.

FIGS. 5-7 provide a solution to this problem. More particularly, console 100 has an upper surface 102. An opening 104 in the upper surface 102 allows access to a pocket 110 which in this embodiment is formed as a recessed member having sidewalls 112, 114, 116, 118 that extend upwardly from a base or bottom wall 120. Preferably, the sidewalls have a slight taper as they extend upwardly and slightly outwardly from the bottom wall 120. In addition, sidewall 116 includes a first or lower portion 116A and a second or upper portion 116B that is interconnected by a contoured transition region 116C.

Figure 4:
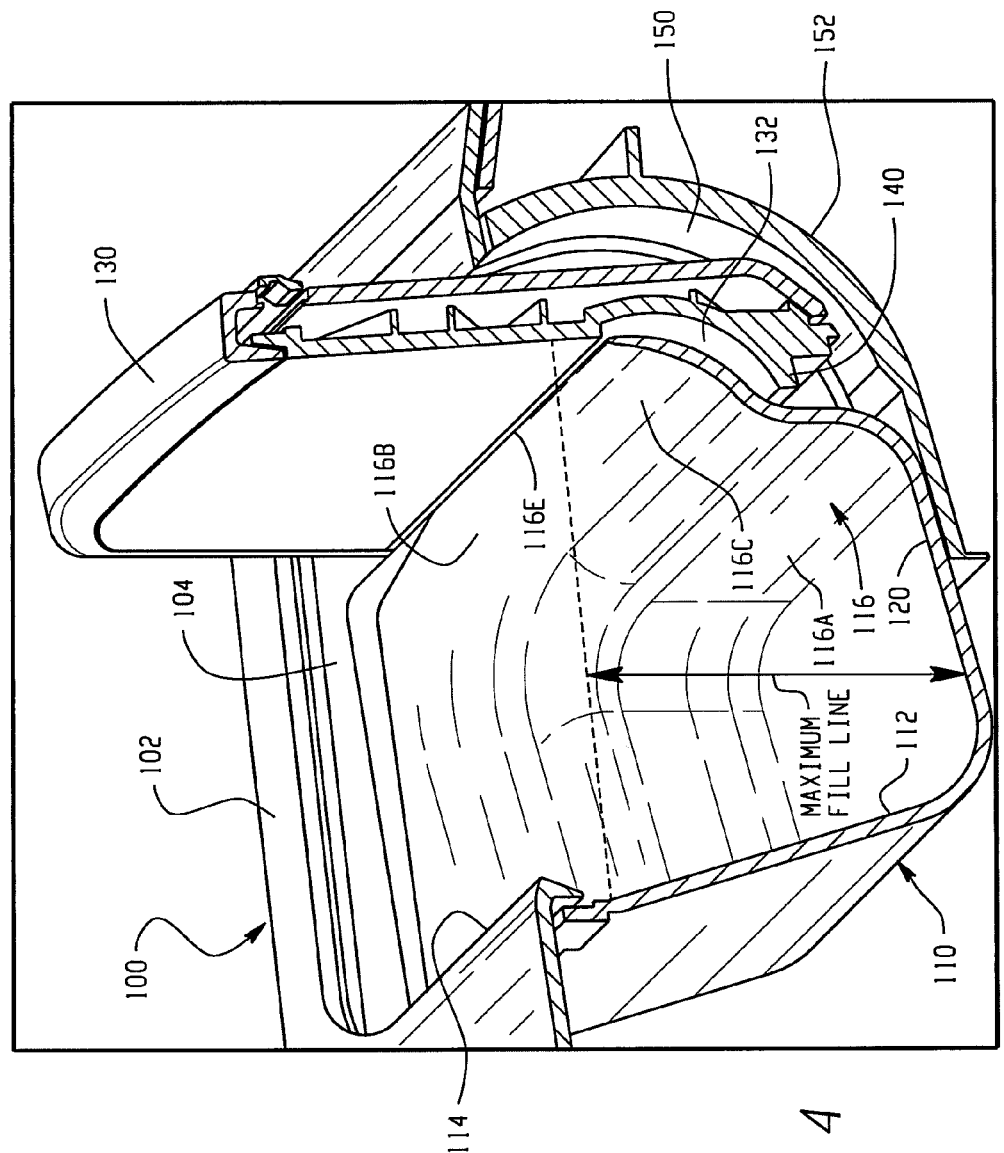
FIG. 4 is a cross-sectional view similar to FIG. 2 of an improved storage assembly.

It is particularly evident in FIGS. 4, 5, and 7 that sidewall 116 has a reduced height relative to the remaining sidewalls 112, 114, 118. This reduced height that terminates at upper edge 116E of the sidewall 116 accommodates pivoting/limited rotating movement of lid 130 between an open position (FIGS. 4, 6, and 7) and a closed position (FIG. 5). The lid 130 has a substantially planar conformation but is modified relative to prior art arrangements by the inclusion of recess 132. In the preferred arrangement, the recess 132 has an arcuate or curvilinear configuration. Particularly, the arcuate recess 132 in the lid is shaped relative to the pivoting or rotational axis of the lid so that the surface of the recess proceeds in closely spaced relation over the upper edge 116E of the sidewall.

In addition, an object bumper, or series of object bumpers, 140 are formed in an underside of the lid and are provided adjacent the recess. As perhaps best illustrated in FIG. 6, the object bumpers 140 extend outwardly from an underside of the lid in spaced relation relative to one another. The object bumpers 140 are preferably interposed between the recess 132 and a terminal edge 142 of the lid. Each of the object bumpers 140 is configured to advantageously extend the curvilinear shape of the recess 132 toward the terminal edge 142 of the lid (FIG. 5). In this way, an inward edge of each of the object bumpers 140 is disposed adjacent the recess 132 while an outboard edge of each of the object bumpers is disposed adjacent the terminal edge 142 of the lid. The longitudinal spacing between the object bumpers is selected to minimize the potential for small objects to pass over the upper edge 116E of sidewall 116 and into lid-receiving cavity 150 of the console.

The cavity 150 is formed in part by wall 152 that also has a partially arcuate conformation that tracks the pivoting movement of the lid 130, and particularly the leading edge 142 as the lid rotates over the sidewall 116. The cavity 150 is also defined by the contour of the sidewall 116, including the contour of transitional portion 116C. This contour of the sidewall closely matches that of the combined recess 132 and object bumpers 140 formed in the underside 130A of the lid. Thus, when the lid 130 is in a full open position (FIG. 4), the underside 130A of the lid mates with the sidewall 116. In addition, the shape of pocket sidewall 116 advantageously hides the object bumpers 140 and the recess 132 when the lid 130 is in a full open position.

FIGS. 4 and 5 illustrate that the "max fill line" of the pocket, i.e. the depth dimension measured from base wall 120 to the top of sidewalls 114, 118, extends upwardly to the lip of the respective sidewalls 112, 114, and 118. As evident in FIG. 5, the "max fill line" coincides with an undersurface 130A of the lid in the closed position. When the lid is open, the "max fill line" is maintained because the recess 132 and object bumpers 140 preclude passage of objects or items over the upper edge 116E of the sidewall 116 into cavity 150. Thus, even though the sidewall 116 has a height less than a fill depth of the pocket (or less than the "max fill line"), the object bumpers and the recess advantageously limit the potential for items to leave the pocket over the edge 116E of the reduced height sidewall 116.

This written description uses examples to describe the disclosure, including the best mode, and also to enable any person skilled in the art to make and use the disclosure. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

We claim:

1. A storage assembly for an associated vehicle, the storage assembly comprising:
    a surface having a perimeter edge and a pocket in the surface for storing associated articles therein; and
    a lid pivotally secured to one of the surface or pocket, and selectively positionable between an open position that allows access to the pocket and a closed position that covers the pocket, the lid having an inner, first surface that coincides with a maximum fill line of the pocket when the lid is in the closed position, a generally arcuate recess formed in the first surface of the lid adjacent a first edge of the lid, and a series of at least three discrete, periodically spaced object bumper projections protruding along an interior surface of the generally arcuate recess for preventing the associated articles from interfering with pivotal movement of the lid relative to the pocket.

2. The storage assembly of claim 1 wherein the pocket has a first edge in close proximity to the lid arcuate recess during pivotal movement between the open and closed positions.

3. The storage assembly of claim 1 wherein the object bumper projections each have a generally arcuate conformation that allows the lid to pivot from the open position to the closed position, and vice-versa.

4. The storage assembly of claim 1 wherein each object bumper projection has a generally arcuate conformation that allows the lid to pivot from the open position to the closed position, and vice-versa.

5. The storage assembly of claim 1 wherein the pocket includes generally tapered sidewalls that extend from a base wall, and a transition region provided along one of the sidewalls that extends outwardly in a generally arcuate contour that corresponds to the generally arcuate recess in the lid first surface.

6. The storage assembly of claim 1 wherein the pocket includes a terminal edge over which the lid pivots between the open and closed positions, the terminal edge having a height less than a fill depth of the pocket.

7. The storage assembly of claim 6 wherein the terminal edge has a height less than a remainder of an upper edge of the pocket.

8. The storage assembly of claim 1 wherein the pocket includes a terminal edge over which the lid pivots between the open and closed positions, the terminal edge having a height less than a fill depth of the pocket.

9. A storage assembly for a vehicle comprising:
a surface having an opening;
a pocket extending from the surface adjacent the opening and dimensioned to store articles therein;
a lid mounted for pivoting movement between an open, first position and a closed, second position, the lid having (i) an undersurface with a substantially planar portion that overlies a major portion of the pocket in the lid closed position, and (ii) a recess along one edge that is contoured for receipt over a terminal edge of the pocket, the recess comprising a series of at least three discrete, periodically spaced object bumper projections protruding along an interior surface of the recess for preventing associated articles stored in the pocket from interfering with opening and closing of the lid relative to the surface opening.

10. The storage assembly of claim 9 wherein the object bumper projections each have a conformation that allows the lid to pivot from the open position to the closed position, and vice-versa.

11. The storage assembly of claim 9 wherein each object bumper projection has a conformation that allows the lid to pivot from the open position to the closed position, and vice-versa.

12. The storage assembly of claim 9 wherein the pocket includes a terminal edge having a height less than a remainder of an upper edge of the pocket and over which the lid pivots between the open and closed positions, the terminal edge having a height less than a fill depth of the pocket.

13. The storage assembly of claim 9 wherein the pocket includes generally tapered sidewalls that extend from a base wall, and a transition region provided along one of the sidewalls that extends outwardly in a contour that substantially corresponds to the recess in the lid first surface.

14. The storage assembly of claim 13 wherein the extension has a generally arcuate contour that corresponds to a generally arcuate contour of the recess in the lid first surface.

15. A storage assembly for small items in a vehicle comprising:
a surface having an opening;
a pocket extending from the surface adjacent the opening and dimensioned to store articles therein;
a lid mounted for pivoting movement between open and closed positions, the lid having a recess along one edge that is contoured for receipt over a terminal edge of the pocket and comprising a series of at least three discrete, periodically spaced object bumper projections protruding along an interior surface of the recess for preventing associated articles stored in the pocket from interfering with opening and closing of the lid relative to the surface opening, the object bumper projections and the recess following a pocket sidewall contour that allows the lid to be pivoted relative to the pocket into an adjacent cavity in the lid open position.

16. The storage assembly of claim 15 wherein the terminal edge has a height less than a fill depth of the pocket.

17. The storage assembly of claim 15 wherein the terminal edge has a height less than a remainder of an upper edge of the pocket.

* * * * *